US008447492B2

(12) United States Patent
Watanabe et al.

(10) Patent No.: US 8,447,492 B2
(45) Date of Patent: May 21, 2013

(54) ENGINE CHARACTERISTIC ESTIMATION METHOD, AND COMPUTER READABLE MEDIUM

(75) Inventors: Satoru Watanabe, Susono (JP); Mitsuharu Sugita, Kitamoto (JP)

(73) Assignees: Toyota Jidosha Kabushiki Kaisha, Toyota-shi (JP); A&D Company, Limited, Tokyo (JP)

( * ) Notice: Subject to any disclaimer, the term of this patent is extended or adjusted under 35 U.S.C. 154(b) by 1141 days.

(21) Appl. No.: 12/376,579

(22) PCT Filed: Mar. 31, 2008

(86) PCT No.: PCT/IB2008/000755
§ 371 (c)(1),
(2), (4) Date: Feb. 6, 2009

(87) PCT Pub. No.: WO2008/120082
PCT Pub. Date: Oct. 9, 2008

(65) Prior Publication Data
US 2010/0179742 A1 Jul. 15, 2010

(30) Foreign Application Priority Data
Apr. 2, 2007 (JP) ................................. 2007-096593

(51) Int. Cl.
*F02D 41/14* (2006.01)
*F02P 5/15* (2006.01)
(52) U.S. Cl.
USPC .......................................... 701/101; 701/114
(58) Field of Classification Search
USPC ................................................. 701/101–115
See application file for complete search history.

(56) References Cited

U.S. PATENT DOCUMENTS

| 6,278,899 | B1 * | 8/2001 | Piche et al. .................... 700/44 |
| 6,415,779 | B1 * | 7/2002 | Colomby ....................... 123/674 |
| 7,016,779 | B2 * | 3/2006 | Bowyer ......................... 701/108 |
| 7,328,577 | B2 * | 2/2008 | Stewart et al. ................. 701/108 |
| 8,103,425 | B2 * | 1/2012 | Choi et al. ..................... 701/110 |
| 2004/0006973 | A1 * | 1/2004 | Makki et al. .................... 60/285 |
| 2005/0131620 | A1 * | 6/2005 | Bowyer ......................... 701/108 |

FOREIGN PATENT DOCUMENTS

| DE | 102 59 851 | 7/2004 |
| DE | 10 2006 003 156 | 7/2007 |
| JP | 2002 206456 | 7/2002 |
| JP | 2007 239515 | 9/2007 |
| WO | 03 065135 | 8/2003 |

* cited by examiner

*Primary Examiner* — Stephen K Cronin
*Assistant Examiner* — Arnold Castro
(74) *Attorney, Agent, or Firm* — Oblon, Spivak, McClelland, Maier & Neustadt, L.L.P.

(57) ABSTRACT

A method for estimating steady state values of engine operating characteristics is provided so that engine control can later be based on the estimated values. An amount of change in a specific engine characteristic (for which the steady state values are to be estimated) is set as a product of an unknown value and a dimensionless known value for predetermined times from when a specific engine control parameter is changed. A value of the specific engine characteristic at a given time is calculated as a sum of the products at the given time, with the products respectively corresponding to plural prior changes in the specific engine control parameter. Unknown values are calculated multiple times based on values of the specific engine characteristic measured in a conformance test, and the steady state values of the specific engine characteristic are estimated.

31 Claims, 3 Drawing Sheets

ENGINE CHARACTERISTIC ESTIMATION METHOD, AND COMPUTER READABLE MEDIUM

BACKGROUND OF THE INVENTION

1. Field of the Invention

The invention relates to an engine characteristic estimation method for estimating a steady state value of an engine characteristic that changes in accordance with an engine control parameter, and a computer readable medium that stores a computer executable code which executes an engine characteristic estimation method for estimating a steady state value of an engine characteristic that changes in accordance with an engine control parameter.

2. Description of the Related Art

In a commonly-used engine, it is preferable to control engine control parameters such as ignition timing and an air-fuel ratio (a fuel injection amount) in each engine operating state, which is defined by an engine speed and an engine load, to achieve optimum engine characteristics such as engine output power, exhaust emission, exhaust gas temperature, and catalytic device temperature. In order to execute this control, target values of the engine control parameters in each engine operating state need to be set in advance.

To set the target values, a conformance test is executed in the following manner using, for example, a prototype engine. In each engine operating state, a specific engine control parameter is changed with the other engine control parameters fixed. Then, a change in a specific engine characteristic is monitored, whereby a specific engine control parameter value at which the specific engine characteristic is at the optimum value is determined.

In this conformance test, the engine characteristic, which is subject to monitoring, does not change to the steady state value promptly in response to a change in the specific engine control parameter. If each value of the specific engine control parameter remains unchanged until the specific engine characteristic, which is subject to monitoring, reaches the steady state value corresponding to the value of the specific engine control parameter, a considerably long test time is required until the specific engine characteristic, which is subject to monitoring, reaches the steady state value. If this process is performed for all of the engine operating states, a huge amount of time is required to complete the conformance test.

In order to reduce the conformance test time in each engine operating state, the following method is suggested in, for example, Japanese Patent Application Publication No. 2002-206456 (JP-A-2002-206456). According to this method, a specific engine control parameter is varied within an estimated range, and several steady state values of a specific engine characteristic are measured for the corresponding several values of the specific engine control parameter. Then, a model equation is set based on these several steady state values of the specific engine control parameter, and the steady state values of the specific engine characteristic are estimated to correspond to other values of the specific engine control parameter.

However, the values of the specific engine characteristic corresponding to the other values of the specific engine control parameter are not taken into account in the estimation of the steady state values of the specific engine characteristic, which correspond to the other values of the specific engine control parameter. Therefore, the reliability of the estimated steady state values is not very high.

For example, a steady state value of the specific engine characteristic may be estimated in the following method. In a specific engine operating state, a change in a specific engine characteristic, which is caused when the specific engine control parameter is changed, is modeled based on a recurrence equation model (for example, an ARX model) in which a post-change specific engine control parameter is used. Then, several values of the specific engine characteristic are measured after the specific engine control parameter is changed. In this way, the steady state value of the specific engine characteristic is estimated, which corresponds to the post-change specific engine control parameter. According to this estimation method, it is no longer necessary to maintain the post-change specific engine control parameter until the specific engine characteristic becomes the steady state value. Therefore, the conformance test time is reduced. In addition, the reliability of the estimated steady state value of the specific engine characteristic is high, because the value of the specific engine characteristic, which is obtained when the specific engine control parameter is changed, is taken into account in the estimation.

In the specific engine operating state, if the specific engine control parameter is changed to a first value from when the specific engine characteristic is at a steady state value and a first steady state value of the specific engine characteristic is estimated as described above, which corresponds to the first value of the specific engine control parameter, the reliability of the estimated first steady state value is high.

However, if the value of the specific engine control parameter is changed from a first value to a second value, and then from a second value to a third value, it is not possible to accurately estimate the steady state value of the specific engine characteristic (which corresponds to the second value of the specific engine control parameter) during the period in which the value of the specific engine control parameter is changed from the second value to the third value, even if the value of the specific engine control parameter during this period is directly substituted into the above-described ARX model. This is because the value of the specific engine characteristic during this period is influenced by the engine operation that is performed when the specific engine control parameter is at the first value.

SUMMARY OF THE INVENTION

The invention relates to an engine characteristic estimation method for accurately estimating steady state values of a specific engine characteristic, which correspond to respective values of a specific engine control parameter, based on values measured in a conformance test, and a computer readable medium that stores a computer executable code that executes the method. The estimation method can be particularly advantageous when the time of the conformance test in a specific engine operating state is reduced.

A first aspect of the invention relates to an engine characteristic estimation method for estimating steady state values of a specific engine characteristic, which correspond to respective values of a specific engine control parameter in a specific engine operating state. By way of example, according to a disclosed method, an amount of change in the specific engine characteristic is set for each different predetermined times from when the specific engine control parameter is changed at the specific engine operating state. The amount of change is set as a product of an unknown value and a dimensionless known value. The unknown value is an amount of change between a steady state value of the specific engine characteristic, which corresponds to a pre-change value of the specific engine control parameter, and a steady state value of the specific engine characteristic, which corresponds to a post-change engine control parameter. The known dimensionless value is a value at each of the predetermined times for the specific engine operating state. A value of the specific engine characteristic at a given time is calculated as a sum of the products at the given time. This calculation is based on the assumption that the specific engine characteristic changes by the change amount between the pre-change and post-change steady state values, after infinite time has elapsed each time the specific engine control parameter is changed before the given time. In addition, a conformance test is performed, in which the specific engine control parameter is changed in a stepwise manner in the specific engine control state. Then, unknown values at multiple times are calculated based on values of the specific engine characteristic measured at the multiple times and the sums calculated for times corresponding to the multiple times. Then, the steady state values of the specific engine characteristic, which correspond to the respective values of the specific engine control parameter, are estimated using the calculated unknowns.

According to a first aspect or example of the invention, the influence of a change in the specific engine characteristic, which is caused due to an immediately preceding change in the specific engine control parameter, is exerted on a change in the specific engine characteristic, which is caused due to a current change in the specific engine control parameter. The values of the specific engine characteristic measured at the multiple times in the conformance test are equal to the respective sums of the above-described products calculated for times that are the same as the multiple times. Therefore, if the unknown values of the respective products that form the above-described sums are calculated, the calculated unknowns correspond to the amounts of change in the steady state values of the specific engine characteristic caused due to respective changes in the specific engine control parameter. Thus, it is possible to accurately estimate the steady state values of the specific engine characteristic, which correspond to the respective values of the specific engine control parameter.

A second aspect or example of the invention relates to an engine characteristic estimation method for estimating steady state values of a specific engine characteristic, which correspond to respective values of a specific engine control parameter in a specific engine operating state. According to this example of the method, an amount of change in the specific engine characteristic is set for each different predetermined times from when the specific engine control parameter is changed at the specific engine operating state. The amount of change is set as a product of an unknown value and a dimensionless known value. The unknown value is an amount of change between a steady state value of the specific engine characteristic, which corresponds to a pre-change value of the specific engine control parameter, and a steady state value of the specific engine characteristic, which corresponds to a post-change engine control parameter. The known dimensionless value is a value at each of the predetermined times for the specific engine operating state. A value of the specific engine characteristic at a given time is calculated as a sum of the products at the given time. This calculation is based on the assumption that the specific engine characteristic changes by the change amount between the pre-change and post-change steady state values, after infinite time has elapsed each time the specific engine control parameter is changed before the given time. In addition, a conformance test is performed, in which the specific engine control parameter is changed continuously at the specific engine control state. Then, unknown values at multiple times are calculated based on values of the specific engine characteristic measured at the multiple times and the sums calculated for times corresponding to the multiple times after causing a continuous change in the specific engine control parameter in the conformance test to approximate a stepwise change in the specific engine control parameter. Then, the steady state values of the specific engine characteristic, which correspond to the respective values of the specific engine control parameter, are estimated using the calculated unknowns.

According to the first aspect or example of the invention, the specific engine control parameter is changed in a stepwise manner in the conformance test. In contrast, according to the second aspect or example of the invention, the conformance test, in which the specific engine control parameter is changed continuously, is performed. Then, the unknowns of the respective products that form the above-described sums are calculated based on the values of the specific engine characteristic measured at the multiple times and the sums of the products calculated for the times that are the same as (or correspond to) the multiple times after causing a continuous change in the specific engine control parameter in the conformance test to approximate a stepwise change in the specific engine control parameter. Thus, it is possible to accurately estimate the steady state values of the specific engine characteristic, which correspond to the respective values of the specific engine control parameter.

In each of the first and second aspects of the invention, when the specific engine characteristic is at a first steady state value that corresponds to a first value or given value of the specific engine control parameter, a preliminary test, in which the specific engine control parameter is changed to a second value, may be performed at the specific engine operating state. The product that is the amount of change in the specific engine characteristic, which results when the specific engine control parameter is changed for each of the predetermined times in the specific engine operating state, may be set based on multiple values of the specific engine characteristic, which are measured at multiple times after the specific engine control parameter is changed from the first value to the second value, and an amount of change from the measured first steady state value to the measured or estimated second steady state value.

According to the above-described configuration, it is possible to easily set the product that is the amount of change in the specific engine characteristic, which results when the specific engine control parameter is changed for each of the predetermined times.

By way of example, in each of the above-described aspects, the specific engine characteristic may be an exhaust gas temperature. The specific engine control parameter may be ignition timing of an engine, for example. Alternately, by way of example, the specific engine control parameter may be at least one of ignition timing of an engine, an air-fuel ratio, intake valve opening timing, exhaust valve closing timing, fuel injection start timing, or a fuel injection pressure.

By way of example, in each of the above-described aspects, engine operation may be controlled based on the estimated steady state values. In controlling engine operation, the steady state values may be used for controlling at least one of ignition timing, intake value timing, exhaust value timing, air-fuel ratio, fuel injection start timing, or fuel injection pressure.

By way of example, in the above-described aspects, the steady state values may be steady state exhaust temperature values. It may further include repeating the estimation method at different specific engine operating states. In each specific engine operating state may correspond to a specific engine speed and engine load.

A third aspect of the invention relates to an engine characteristic estimation method for estimating steady state values of a specific engine characteristic, which correspond to respective values of a specific engine control parameter in a specific engine operating state. By way of example, according to a disclosed method, an amount of change in the specific engine characteristic is set for each different predetermined times from when the specific engine control parameter is changed at the specific engine operating state. The amount of change is set as a product of an unknown value and a dimensionless known value. The unknown value is an amount of change between a steady state value of the specific engine characteristic, which corresponds to a pre-change value of the specific engine control parameter, and a steady state value of the specific engine characteristic, which corresponds to a post-change engine control parameter. The known dimensionless value is a value at each of the predetermined times for the specific engine operating state. A value of the specific engine characteristic at a given time as a sum of the products of each change of the specific engine control parameter is calculated before the given time. In addition, a conformance test is performed, in which the specific engine control parameter is changed in the specific engine control state. Then, unknown values at multiple times are calculated based on values of the specific engine characteristic measured at the multiple times and the sums calculated for times corresponding to the multiple times. Then, the steady state values of the specific engine characteristic, which correspond to the respective values of the specific engine control parameter, are estimated using the calculated unknowns.

By way of example, in the above-described aspects, the specific engine control parameter may be changed in a stepwise manner or the specific engine control parameter may be changed continuously.

A fourth aspect of the invention, there is provided a computer readable medium that stores computer executable code, which executes the method described in the above-described aspect.

As should be apparent, the invention can provide a number of advantageous features and benefits. It is to be understood that, in practicing the invention, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The foregoing and further objects, features and advantages of the invention will become apparent from the following description of examples of embodiments with reference to the accompanying drawings, wherein the same or corresponding portions will be denoted by the same reference numerals and wherein.

DETAILED DESCRIPTION OF EMBODIMENTS

Figure 1:
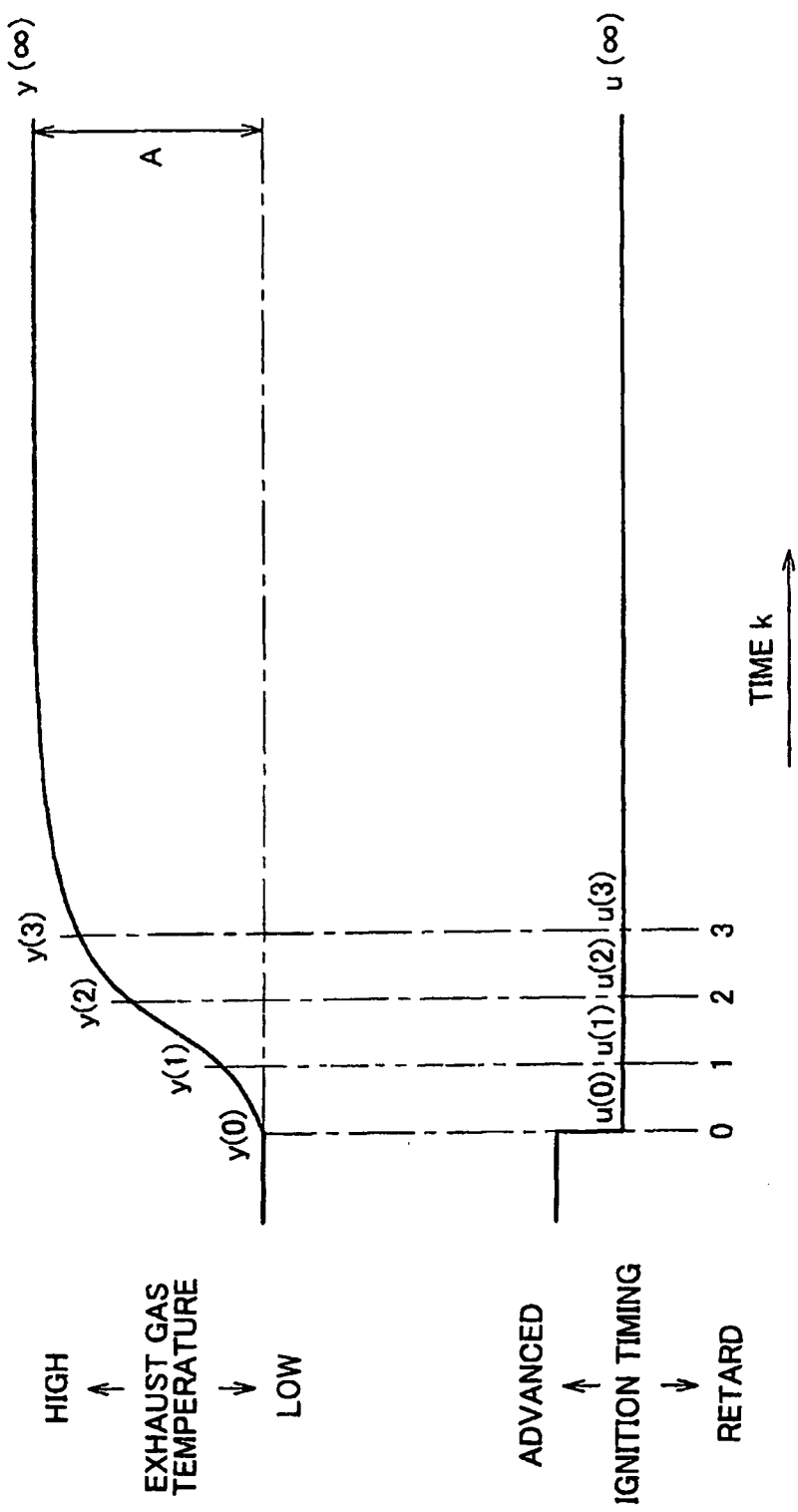
FIG. 1 is a time chart showing a change in the exhaust gas temperature in a preliminary test according to an embodiment of the invention.

In a gasoline engine, engine control parameters such as ignition timing and an air-fuel ratio are used. When the gasoline engine is provided with a variable valve timing mechanism, engine control parameters such as intake valve opening timing and exhaust valve closing timing are added to the engine control parameters to be used. When the gasoline engine is a direct-injection engine, engine control parameters such as fuel injection start timing and fuel injection pressure are further added to the engine control parameters to be used. Controlling these multiple engine control parameters should, without causing a misfire and knocking, achieve an appropriate exhaust gas temperature to maintain the temperature of a catalytic device at an appropriate temperature, and make it possible to perform or operate with an exhaust gas having an appropriate property and a high engine output power in each engine operating state that is defined by an engine speed and an engine load. Therefore, it is necessary to execute a conformance test for setting, in advance, a target value of each engine control parameter in each engine operating state so that the optimum or more optimum operation is performed in each engine operating state. By way of example, the operating state is defined by an engine speed and an engine load.

A conformance test is executed using, for example, a prototype engine. In the conformance test, the manner in which an actual operation proceeds is verified at all of the combinations of the values of the engine control parameters within the estimated ranges. Then, the combination of the values of all the engine control parameters, at which the optimum operation is performed, is determined. More specifically, in each engine operating state, engine control parameters other than a specific engine control parameter are fixed to values within the respective estimated ranges. In addition, the specific engine control parameter is changed, for example, in a stepwise manner within the estimated range, and steady state values of the specific engine characteristic, which correspond to respective values of the specific engine control parameter achieved by changing the specific engine control parameter in the stepwise manner, are measured. In each engine operating state, each of the other engine control parameters is changed in a stepwise manner, and steady state values of the specific engine characteristic, which correspond to respective values of the specific engine control parameter achieved by changing the specific engine control parameter in a stepwise manner, is measured. Therefore, a huge amount of time is required to complete the conformance test.

According to an embodiment or example of the invention, in each engine operating state, it is possible to accurately estimate steady state values of a specific engine characteristic, which correspond to respective values of a specific engine control parameter, based on measured values obtained by a conformance test in which the specific engine control parameter is changed, before the specific engine characteristic becomes or actually reaches the steady state values for the respective specific engine control parameter values. As a result, the time required to complete the conformance test is reduced. Hereafter, an engine characteristic estimation method according to an example of an embodiment of the invention will be described on the assumption that, by way of example, the ignition timing is used as the specific engine control parameter, and the exhaust gas temperature is used as the specific engine characteristic. Note that, the engine characteristic estimation method according to the embodiment of the invention may be applied to a case where a combination of any given engine control parameter and any given engine characteristic is used.

FIG. 1 is a time chart showing a change in the exhaust gas temperature, which is caused when the ignition timing is changed in a specific engine operating state that is defined by a specific engine speed and a specific engine load. Although the post-change ignition timing is a constant value, the post-change ignition timing is regarded as a time function u(k) that is expressed by u(0), u(1), u(2), and u(3). The exhaust gas temperature after the ignition timing is changed is regarded as a time function y(k) that is expressed by y(0), y(1), y(2), and y(3). When a change in the exhaust gas temperature is expressed by a recurrence equation model, for example, an ARX model, Equation 1 is derived.

$$y(k+1) = ay(k) + bu(k) \qquad \text{Equation 1}$$

A time function Z(k) is derived by making an amount of change in the exhaust gas temperature, which results when the ignition timing is changed until each predetermined time, dimensionless by an amount of change A (hereinafter, referred to as "change amount A") from a steady state value of the exhaust gas temperature, which corresponds to the pre-change ignition timing, to a steady state value of the exhaust gas temperature, which corresponds to the post-change ignition timing. The time function Z (k) thus derived is expressed by Equation 2.

$$Z(k) = (k) - y(0))/A \qquad \text{Equation 2}$$

Equation 2 is established also at time k+1. In this case, Equation 3 is derived.

$$Z(k+1) = (y(k+1) - y(0))/A \qquad \text{Equation 3}$$

In Equation 1, when y(k+1) and y(k) are cancelled by Equations 2 and 3, Equation 4 is derived.

$$Z(k+1) = aZ(k) + (ay(0) + bu(k) - y(0))/A \qquad \text{Equation 4}$$

Because bu(k) is equal to bu(0), Equation 4 is expressed by Equation 5.

$$Z(k+1) = aZ(k) + (y(1) - y(0))/A \qquad \text{Equation 5}$$

In Equation 5, when a=p, and (y(1)-y(0))/A=q, the time function Z(k) is expressed by Equation 6.

$$Z(k+1) = pZ(k) + q \qquad \text{Equation 6}$$

The value q in Equation 6, namely, the value of (y(1)-y(0))/A is obtained by dividing the amount of change in the exhaust gas temperature immediately after the ignition timing is changed (y(1)-y(0)) by the change amount A between the steady state value of the exhaust temperature, which corresponds to the pre-change ignition timing, and the steady state value of the exhaust gas temperature, which corresponds to the post-change ignition timing. If the amount of change in the ignition timing is large and the amount of change in the exhaust gas temperature is, for example, doubled, the change amount A between the steady state values of the exhaust gas temperature is considered to be nearly doubled. If the engine operating state is constant, the value q is a constant value that is independent of the amount of change in the ignition timing.

According to an example of an embodiment of the invention, first, a preliminary test is executed in a specific engine operating state. In the preliminary test, first, a given ignition timing is used as a first given value and the exhaust gas temperature that corresponds to the first given value is used as a first steady state value corresponding to the first value. Then, another given ignition timing is used as a second given value, and the exhaust gas temperature that corresponds to the second given value is used as a second steady state value corresponding to the second value. In the preliminary test, the exhaust gas temperature (first steady state value) y(0) that is achieved at the moment that the ignition timing is changed from the first value to the second value, exhaust gas temperatures y(1), y(2), y(3), to y(k) at predetermined times that are reached at predetermined time intervals, and the second steady state value of the exhaust gas temperature, which corresponds to the second value of the ignition timing are measured. If the exhaust gas temperatures y(1), y(2), y(3), to y(k) at predetermined times are measured, a coefficient a and a coefficient b are calculated according to the simultaneous equation or the least square method in Equation 1, because the second value (u(∞)) of the post-change ignition timing is known. In addition, the second steady state value y(∞) of the exhaust gas temperature can be estimated according to Equation 7.

$$y(\infty) = bu(\infty)/(1-a) \qquad \text{Equation 7}$$

When the second steady state value is estimated in the above-described manner, the preliminary test, in which the ignition timing is changed to the second value, can be completed before the exhaust gas temperature becomes or reaches the second steady state value.

Concerning the time function Z in Equation 6, the following relationships are established.

$$Z(1) = pZ(0) + q$$
$$Z(2) = pZ(1) + q$$
$$Z(3) = pZ(2) + q$$
$$\vdots$$
$$Z(k) = pZ(k-1) + q$$

The values Z(0) to Z(k) can be calculated according to Equation 2 based on the exhaust gas temperatures y(1), y(2), y(3), to y(k) at predetermined times and the change amount A between the steady state values of the exhaust gas temperature (second steady state value−first steady state value). Then, the value p and the value q can be calculated by preferably the least squares method or the simultaneous equation according to the above-described relational expressions.

The exhaust gas temperatures at predetermined times need not be measured at consecutive predetermined times from when the ignition timing is changed. The exhaust gas temperature should be measured at several times selected from among the predetermined times from when the ignition timing is changed, so that the value p and the value q can be calculated. For example, even if y(2) is not measured and Z(2) cannot be calculated, the value p and the value q can be calculated using another time function Z(k).

As described above, if the engine operating state is constant, the thus calculated value p and value q are constant values that are independent of the amount of change in the ignition timing. According to Equation 2, the amount of change in the exhaust gas temperature, which is caused from when the ignition timing is changed until each predetermined time (y(k)−y(0)), can be expressed by the product of the change amount A between the steady state value of the exhaust gas temperature, which corresponds to the pre-change ignition timing, and the steady state value of the exhaust gas temperature, which corresponds to the post-change ignition timing, and the or dimensionless value number Z(k). In this case, the change amount A is a value that changes depending on the value of the post-change ignition timing. If the ignition timing is changed in a manner that differs from that used in the preliminary test, the change amount A is an unknown.

Figure 2:
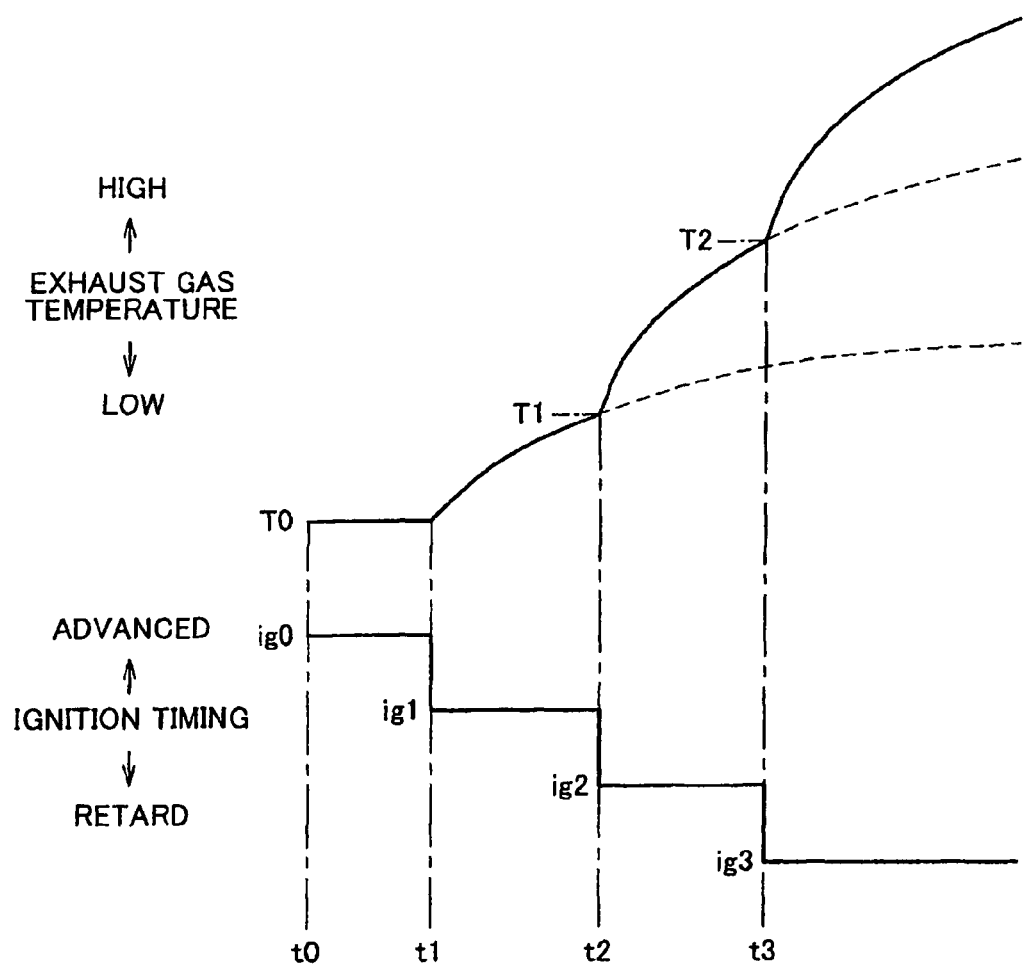
FIG. 2 is a time chart showing a change in the exhaust gas temperature in a conformance test in which the ignition timing is changed in a stepwise manner according to the embodiment of the invention.

According to the example of an embodiment of the invention, a conformance test is executed. In the conformance test, the exhaust gas temperature is monitored while the ignition timing is changed in a stepwise manner, as shown in FIG. 2, in the engine operating state that is the same as that used in the preliminary test. A more detailed description will be provided below. The ignition timing is ig0 at time t0. When the exhaust gas temperature is at the steady state value T0 of the exhaust gas temperature, which corresponds to the ignition timing ig0, the ignition timing is changed from ig0 to ig1 at time t1. Then, the ignition timing is changed from ig1 to ig2 at time t2 at which the exhaust gas temperature becomes the exhaust gas temperature T1 that is exhibited before the exhaust gas temperature reaches the steady state value which corresponds to the ignition timing ig1. Then, the ignition timing is changed from ig2 to ig3 at time t3 at which the exhaust gas temperature becomes the exhaust gas temperature T2 that is exhibited before the exhaust gas temperature reaches the steady state value which corresponds to the ignition timing ig2. The exhaust gas temperature Y(k) at each predetermined time may be set according to Equations 8 to 11, in the case where the ignition timing is retard (or delayed) in a stepwise manner.

The exhaust gas temperature at each predetermined time between time t0 and time t1 is a constant value T0, and expressed by Equation 8.

$$Y(k)=T0 \qquad \text{Equation 8}$$

The exhaust gas temperature at each predetermined time between time t1 and time t2 is expressed by Equation 9 using the above-described time function Z, if the amount of change from the steady state value of the exhaust gas temperature, which corresponds to the ignition timing ig0, to the steady state value of the exhaust gas temperature, which corresponds to the ignition timing ig1, is A1.

$$Y(k)=T0+A1\times Z(k-t1) \qquad \text{Equation 9}$$

The exhaust gas temperature at each predetermined time between time t2 and time t3 is influenced not only by a change in the ignition timing from the ignition timing ig1 to the ignition timing ig2 at time t2 but also by all the changes in the ignition timing before time t2, namely, a change in the ignition timing at time t1. In this example embodiment of the invention, it is considered that an increase in the exhaust gas temperature caused in response to a change in the ignition timing at time t1 is independent of changes in the ignition timing after time t1, as shown by the dashed line, and the above-described change amount A1 is achieved when infinite time has elapsed since time t1. Thus, when the amount of change from the steady state value of the exhaust gas temperature, which corresponds to the ignition timing ig1, to the steady state value of the exhaust gas temperature, which corresponds to the ignition timing ig2, is A2, the exhaust gas temperature at each predetermined time between time t2 and time t3 is expressed by Equation 10 using the above-described time function Z.

$$Y(k)=T0+A1\times Z(k-t1)+A2\times Z(k-t2) \qquad \text{Equation 10}$$

The exhaust gas temperature at each predetermined time after time t3 is influenced not only by a change in the ignition timing from the ignition timing ig2 to the ignition timing ig3 at time t3 but also by all the changes in the ignition timing before time t3, namely, changes in the ignition timing at time t1 and time t2. According to this example embodiment of the invention, an increase in the exhaust gas temperature caused in response to a change in the ignition timing at time t2 is independent of changes in the ignition timing after time t2, as shown by the dashed line, and it is considered that the above-described change amount A2 is achieved when infinite time has elapsed since time t2. Thus, when the amount of change from the steady state value of the exhaust gas temperature, which corresponds to the ignition timing ig2, to the steady state value of the exhaust gas temperature, which corresponds to the ignition timing ig3, is A3, the exhaust gas temperature at each predetermined time after time t3 is expressed by Equation 11 using the above-described time function Z.

$$Y(k)=T0+A1\times Z(k-t1)+A2\times Z(k-t2)+A3\times Z(k-t3) \qquad \text{Equation 11}$$

In the conformance test, when the ignition timing is further changed, an equation for estimating the exhaust gas temperature at each predetermined time may be set based on the same concept. In the conformance test, it is not necessary to keep the interval, at which the ignition timing is changed, constant. However, the ignition timing is changed preferably at time intervals each of which is an integral multiple of the interval between the predetermined times that are used when the time function Z(k) specific to the specific engine operating state is set in the preliminary test. Preferably, a given time from among the predetermined times after time t1 matches time t2.

In Equation 8, T0 becomes a known value by an actual measurement. In Equation 9, T0 is known. If the exhaust gas temperature Y(i1) is measured at least a time i1 between time t1 and time t2 (time t1 is not included and time t2 may be included), an unknown A1 can be calculated, because the dimensionless number Z(i1−t1) which corresponds to time (i1−t1) from time t1 to time i1 is known. In Equation 10, T0 is known. If the exhaust gas temperature Y(i2) is measured at least a time i2 between time t2 and time t3 (time t2 is not included, and time t3 may be included), an unknown A2 can be calculated. This is because the dimensionless value Z(i2−t1), which corresponds to time (i2−t1) from time t1 to time i2 is known and A1 is also known. In addition, the dimensionless value Z(i2−t2), which corresponds to time (i2−t2) from time t2 to time i2 is also known.

In Equation 11, T0 is known. If the exhaust gas temperature Y(i3) at least a time i3 after time t3 is measured, an unknown A3 can be calculated. This is because the dimensionless value Z(i3−t1), which corresponds to time (i3−t1) from time t1 to time i3 is known, and A1 is also known. In addition, the dimensionless value Z(i3−t2), which corresponds to time (i3−t2) from time t2 to time i3 is known, and A2 is also known. Further, the dimensionless value Z(i3−t3), which corresponds to time (i3−t3) from time t3 to time i3 is known.

In order to further accurately calculate unknowns A1, A2 and A3, the exhaust gas temperature may be measured at more times in each of the period between time t1 and time t2, the period between time t2 and time t3, and the period after time t3. Because the dimensionless values Z at any predetermined times are known, the unknowns A1, A2 and A3 may be calculated according to the least squares method based on all the exhaust gas temperatures.

The value A1, which has become known, is the amount of change from the steady state value of the exhaust gas temperature, which corresponds to the ignition timing ig0 to the steady state value of the exhaust gas temperature, which corresponds to the ignition timing ig1. Namely, the exhaust gas temperature T0+A1 becomes the steady state value of the exhaust gas temperature, which corresponds to the ignition timing ig1. The value A2, which has become known, is the amount of change from the steady state value of the exhaust gas temperature, which corresponds to the ignition timing ig1, to the steady state value of the exhaust gas temperature, which corresponds to the ignition timing ig2. Namely, the exhaust gas temperature T0+A1+A2 becomes the steady state value of the exhaust gas temperature, which corresponds to the ignition timing ig2. The value A3, which has become known, is the amount of change from the steady value of the exhaust gas temperature, which corresponds to the ignition timing ig2, to the steady value of the exhaust gas temperature, which corresponds to the ignition timing ig3. Namely, the exhaust gas temperature T0+A1+A2+A3 becomes the steady state value of the exhaust gas temperature, which corresponds to the ignition timing ig3.

Thus, it is possible to accurately estimate the steady state values of the exhaust gas temperature, which corresponds to the respective values of the ignition timing. In addition, in the conformance test for estimating the steady state values of the exhaust gas temperature, it is not necessary to keep the ignition timing unchanged until the exhaust gas temperature reaches the steady state value, which corresponds to the post-change ignition timing, each time the ignition timing is changed. As a result, the conformance test time is considerably reduced.

According to the example embodiment of the invention, the conformance test is executed in the engine operating state that is the same as the specific engine operating state used in the preliminary test, and the steady state values of the exhaust gas temperature, which correspond to the respective values of the ignition timing in this engine operating state are estimated. When more appropriate, the preliminary test should be executed in all the other engine operating states, the time function Z specific to each engine operating state should be set, and the conformance test should be executed in the corresponding engine operating state. However, because the time function Z is a function of an engine speed and an engine load, if two time functions Z are obtained by executing the preliminary test in two engine operating states that are different only in the engine speed (or the engine load), a part of the preliminary test may be omitted by setting, by interpolation, the time function of the engine operating state that is different from the two engine operating states only in the engine speed (or the engine load). If the steady state values of the exhaust gas temperature, which correspond to the respective values of the ignition timing in the engine operating state that is different from the two engine operating states only in the engine speed (or the engine load), are estimated by interpolation based on the steady state values of the exhaust gas temperature, which correspond to the respective values of the ignition timing in these two engine operating states, both the preliminary test and conformance test may be omitted.

Figure 3:
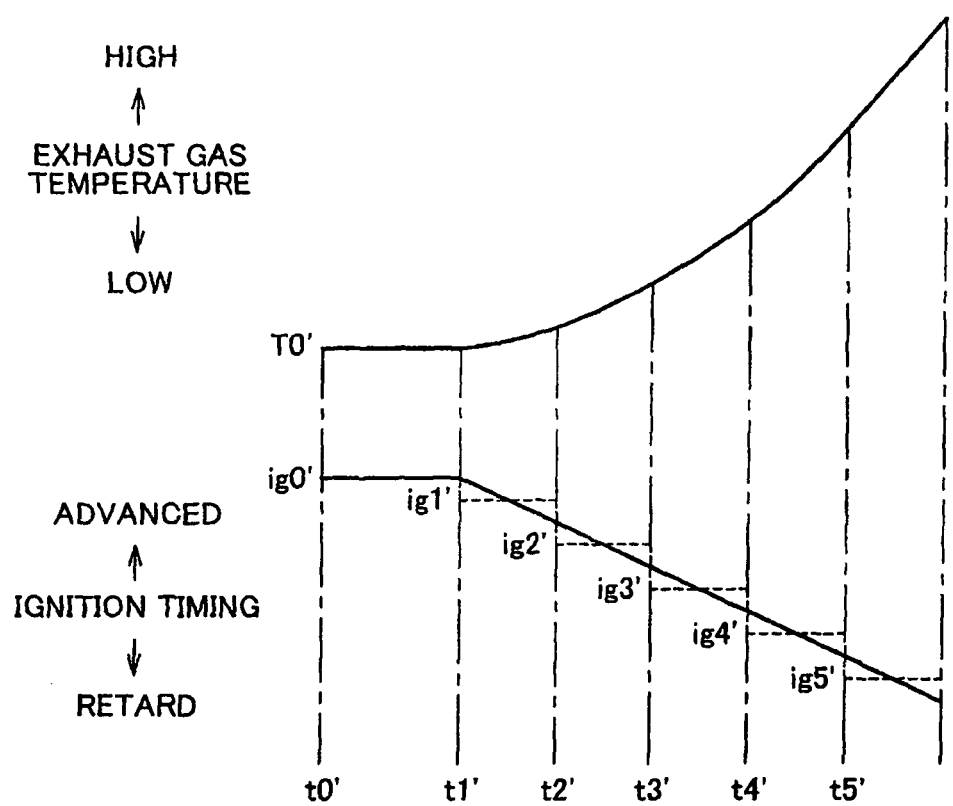
FIG. 3 is a time chart showing a change in the exhaust gas temperature in a conformance test in which the ignition timing is continuously changed according to the embodiment of the invention.

In the example embodiment of the invention described above, the ignition timing is changed in a stepwise manner. Alternatively by way of example, the ignition timing may be continuously changed, as shown in FIG. 3. In this case, the continuously changed ignition timing may be caused to approximate the ignition timing that changes in a stepwise manner as indicated by the dashed line. Thus, Equation 9 may be set based on the concept described above on the assumption that the ignition timing is changed, at time t1', from the ignition timing ig0' to the average ignition timing ig1' between time t1' and time t2' and the ignition timing between time t1' and time t2' is maintained at the average ignition timing ig1'. Similarly, Equation 10 may be set on the assumption that the ignition timing is changed, at time t2', from the ignition timing ig1' to the average ignition timing ig2' between time t2' and time t3' and the ignition timing between time t2' and time t3' is maintained at the average ignition timing ig2'.

Similarly, equations like Equations 10 and 11 may be set. Then, if unknowns A1, A2, A3 to An are calculated, the steady state values of the exhaust gas temperature, which correspond to the ignition timings ig1', ig2', ig3' to ign' can be estimated. In the embodiment shown in FIG. 3, the ignition timing is linearly changed in the conformance test. Alternatively, the ignition timing may be changed in a curved line. Even in this case, the steady state values of the exhaust gas temperature, which correspond to the respective values of the ignition timing, can be estimated.

The engine control may be executed based on the estimated steady values. A computer executable code that executes the method described above may be stored in a computer readable medium, such as an optical disk, magnetic disk, ROM, RAM etc.

Obviously, numerous modifications and variations of the present invention are possible in light of the above teachings. It is therefore to be understood that within the scope of the appended claims, the invention may be practiced otherwise than as specifically described herein.

The invention claimed is:

1. An engine characteristic estimation method for estimating steady state values of a specific engine characteristic, which correspond to respective values of a specific engine control parameter in a specific engine operating state, comprising:

setting an amount of change in the specific engine characteristic for each of different predetermined times from when the specific engine control parameter is changed at the specific engine operating state, wherein the amount of change is set as a product of a change value and a dimensionless known value, and wherein the change value is a change amount in a post-change steady state value of the specific engine characteristic after a change of the specific engine control parameter as compared with a pre-change steady state value before the change in the engine control parameter, and further wherein the dimensionless known value is a value at each of the predetermined times for said specific engine operating state;

calculating a value of the specific engine characteristic at a particular time as a sum of the products of each change of the specific engine control parameter before the particular time, wherein, for each change in the specific engine control parameter, the specific engine characteristic changes by the change amount between the pre-change steady state value and the post-change steady state value corresponding to the change amount resulting after a time has elapsed since the specific engine control parameter is changed, each time the specific engine control parameter is changed before the particular time; and performing a conformance test, in which the specific engine control parameter is changed in a stepwise manner at the specific engine operating state, and obtaining measured values of the specific engine characteristic for multiple times, and calculating change values based on the measured values and sums of products calculated for times corresponding to the multiple times, and then estimating the steady state values of the specific engine characteristic for the respective values of the specific engine control parameter using the calculated change values.

2. An engine characteristic estimation method for estimating steady state values of a specific engine characteristic, which correspond to respective values of a specific engine control parameter in a specific engine operating state, comprising:

setting an amount of change in the specific engine characteristic for each of different predetermined times from when the specific engine control parameter is changed at the specific engine operating state, wherein the amount of change is set as a product of a change value and a dimensionless known value, and wherein the change value is a change amount in a post-change steady state value of the specific engine characteristic after a change of the specific engine control parameter as compared with a pre-change steady state value before the change in the engine control parameter, and further wherein the dimensionless known value is a value at each of the predetermined times for said specific engine operating state;

calculating a value of the specific engine characteristic at a particular time as a sum of the products of each change of the specific engine control parameter before the particular time, wherein, for each change in the specific engine control parameter, the specific engine characteristic changes by the change amount between the pre-change steady state value and the post-change steady state value corresponding to the change amount resulting after a time has elapsed since the specific engine control parameter is changed, each time the specific engine control parameter is changed before the particular time; and performing a conformance test, in which the specific engine control parameter is changed continuously at the specific engine operating state, and obtaining measured values of the specific engine characteristic for multiple times, and calculating change values based on the measured values and sums of products calculated for times corresponding to the multiple times after causing a continuous change in the specific engine control parameter in the conformance test to approximate a stepwise change in the specific engine control parameter, and estimating the steady state values of the specific engine characteristic for the respective values of the specific engine control parameter using the calculated change values.

3. The method according to claim 1, further including:
performing a preliminary test at the specific engine operating state in which the specific engine characteristic is at a first steady state value that corresponds to a first value of the specific engine control parameter, and changing the specific engine control parameter to a second value; and wherein the product that is the amount of change in the specific engine characteristic, which is caused from when the specific engine control parameter is changed for each of the predetermined times at the specific engine operating state, is set based on multiple values of the specific engine characteristic, which are measured at multiple times after the specific engine control parameter is changed from the first value to the second value, and an amount of change from the measured first steady state value to the measured or estimated second steady state value.

4. The method according to claim 1, wherein the specific engine characteristic is an exhaust gas temperature.

5. The method according to claim 1, wherein the specific engine control parameter is ignition timing of an engine.

6. The method according to claim 1, wherein the specific engine control parameter is at least one of ignition timing of an engine, an air-fuel ratio, intake valve opening timing, exhaust valve closing timing, fuel injection start timing, or a fuel injection pressure.

7. The method according to claim 1, further including controlling engine operation based on the estimated steady state values.

8. The method according to claim 7, wherein in controlling engine operation, the steady state values are used for controlling at least one of ignition timing, intake value timing, exhaust value timing, air-fuel ratio, fuel injection start timing, or fuel injection pressure.

9. The method according to claim 8, wherein the steady state values are steady state exhaust temperature values.

10. The method according to claim 9, further including repeating the estimation method at different specific engine operating states.

11. The method according to claim 10, wherein each specific engine operating state corresponds to a specific engine speed and engine load.

12. An engine characteristic estimation method for estimating steady state values of a specific engine characteristic, which correspond to respective values of a specific engine control parameter in a specific engine operating state, wherein engine control is based on the estimated steady state values, the method comprising:

setting an amount of change in the specific engine characteristic for each of different predetermined times from when the specific engine control parameter is changed at the specific engine operating state, wherein the amount of change is set as a product of a change value and a dimensionless known value, and wherein the change value is a change amount in a steady state value of the specific engine characteristic after a change of the specific engine control parameter as compared with a steady state value before the change in the engine control parameter, and further wherein the dimensionless known value is a value at each of the predetermined times for said specific engine operating state;

calculating a value of the specific engine characteristic at a particular time as a sum of the products of each change of the specific engine control parameter before the particular time;

performing a conformance test, in which the specific engine control parameter is changed at the specific engine operating state, and obtaining measured values of the specific engine characteristic for multiple times, and calculating change values based on the measured values and sums of products calculated for times corresponding to the multiple times; and estimating the steady state values of the specific engine characteristic to obtain estimated steady state values which correspond to the respective values of the specific engine control parameter using the calculated change values.

13. The method according to claim 12, wherein the specific engine control parameter is changed in a stepwise manner.

14. The method according to claim 12, wherein the specific engine control parameter is changed continuously.

15. The method according to claim 12, further including controlling engine operation based on the estimated steady state values.

16. The method according to claim 15, wherein in controlling engine operation, the steady state values are used for controlling at least one of ignition timing, intake value timing, exhaust value timing, air-fuel ratio, fuel injection start timing, or fuel injection pressure.

17. The method according to claim 16, wherein the steady state values are steady state exhaust temperature values.

18. The method according to claim 17, further including repeating the estimation method at different specific engine operating states.

19. The method according to claim 18, wherein each specific engine operating state corresponds to a specific engine speed and engine load.

20. A computer readable medium storing a computer executable code, which executes the method described in claim 1.

21. The method according to claim 2, further including:
performing a preliminary test at the specific engine operating state in which the specific engine characteristic is at a first steady state value that corresponds to a first value of the specific engine control parameter, and changing the specific engine control parameter to a second value; and
wherein the product that is the amount of change in the specific engine characteristic, which is caused from when the specific engine control parameter is changed for each of the predetermined times at the specific engine operating state, is set based on multiple values of the specific engine characteristic, which are measured at multiple times after the specific engine control parameter is changed from the first value to the second value, and an amount of change from the measured first steady state value to the measured or estimated second steady state value.

22. The method according to claim 2, wherein the specific engine characteristic is an exhaust gas temperature.

23. The method according to claim 2, wherein the specific engine control parameter is ignition timing of an engine.

24. The method according to claim 2, wherein the specific engine control parameter is at least one of ignition timing of an engine, an air-fuel ratio, intake valve opening timing, exhaust valve closing timing, fuel injection start timing, or a fuel injection pressure.

25. The method according to claim 2, further including controlling engine operation based on the estimated steady state values.

26. The method according to claim 25, wherein in controlling engine operation, the steady state values are used for controlling at least one of ignition timing, intake value timing, exhaust value timing, air-fuel ratio, fuel injection start timing, or fuel injection pressure.

27. The method according to claim 26, wherein the steady state values are steady state exhaust temperature values.

28. The method according to claim 27, further including repeating the estimation method at different specific engine operating states.

29. The method according to claim 28 wherein each specific engine operating state corresponds to a specific engine speed and engine load.

30. A computer readable medium storing a computer executable code, which when executed on a computer executes the method described in claim 2.

31. A computer readable medium storing a computer executable code, which when executed on a computer executes the method described in claim 12.

* * * * *

UNITED STATES PATENT AND TRADEMARK OFFICE
CERTIFICATE OF CORRECTION

PATENT NO. : 8,447,492 B2  
APPLICATION NO. : 12/376579  
DATED : May 21, 2013  
INVENTOR(S) : Satoru Watanabe et al.

Page 1 of 1

It is certified that error appears in the above-identified patent and that said Letters Patent is hereby corrected as shown below:

On the title page, Item (73), the Assignees' Information is incorrect. Item (73) should read:

--(73) Assignees: Toyota Jidosha Kabushiki Kaisha, Toyota-shi (JP); A&D Company, Limited, Toshima-ku (JP)--

Signed and Sealed this  
Eighth Day of April, 2014

Michelle K. Lee  
*Deputy Director of the United States Patent and Trademark Office*